Aug. 24, 1926.

S. B. SARGENT 1,597,294

POLISH ROD CONNECTION

Filed May 5, 1925    2 Sheets-Sheet 1

INVENTOR
SUMNER B. SARGENT
BY
ATTORNEY

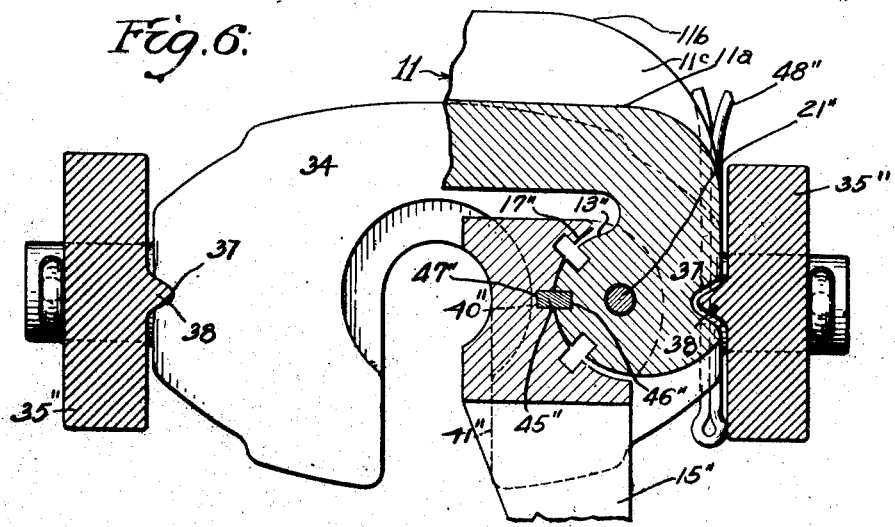
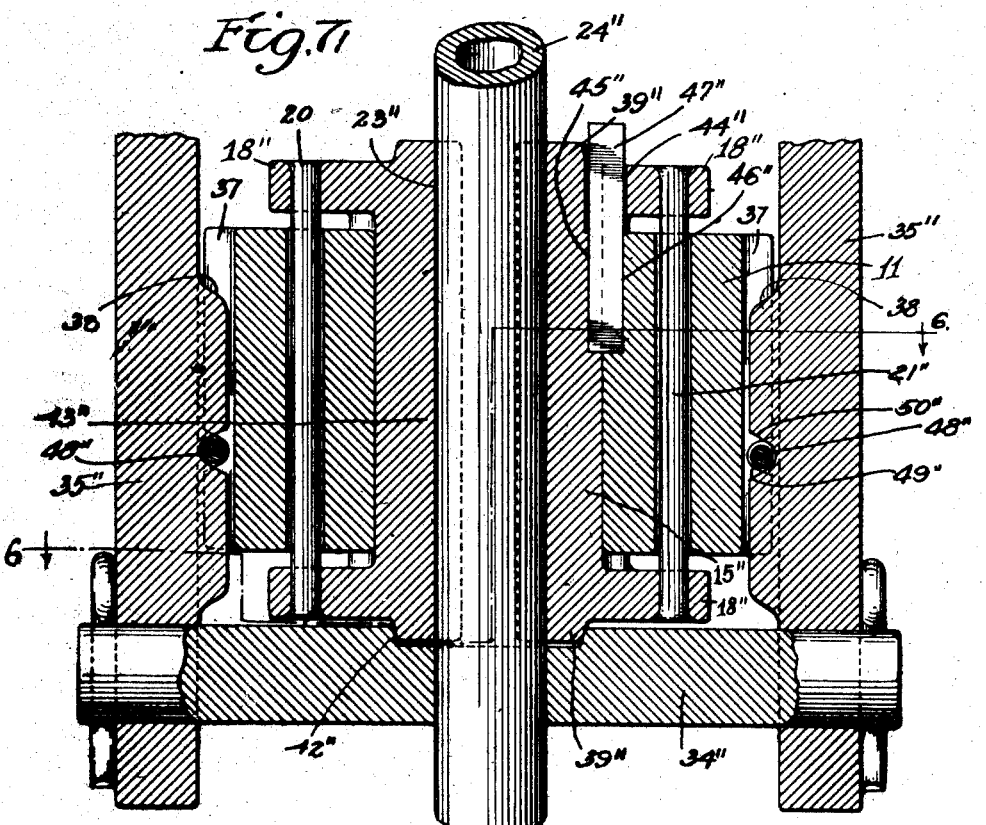

Patented Aug. 24, 1926.

1,597,294

UNITED STATES PATENT OFFICE.

SUMNER B. SARGENT, OF LOS ANGELES, CALIFORNIA.

POLISH-ROD CONNECTION.

Application filed May 5, 1925. Serial No. 28,083.

My present invention being referred to as a polish rod connection, it should be understood that this invention includes not only a special clamp but also an organization in which the mentioned clamp may advantageously be used.

It is an object of this invention to provide means suitable for use, in connection with a usual or special link, forked at its lower end and pivoted to a walking beam, for securely retaining a polish rod, while nevertheless permitting pivotal movement thereof relatively to the lower end of said link.

It is an especial object of this invention to provide a polish rod clamp whose configuration and dimensions adapted it to interfit with and to be removably retained between the legs of a bifurcate link. To these legs an apertured plate may be pivoted; and, in a preferred embodiment of my invention, the mentioned clamp, so proportioned as to overlie said plate and to be retained between said legs, may comprise a pair of separately pivoted arms whose inner ends are respectively provided, on their outer sides, with cylindrical concavities adapted to serve as bearing surfaces. These concavities may contact with corresponding cylindrical surfaces on opposite ends of an intermediate member; and the inner ends of the mentioned arms may also be provided with additional concavities adapted to cooperate in the engagement of a polish rod. The relationships between the axes of curvature of the mentioned concavities and the longitudinal axes of said arms may be such as to render my entire clamp broadly comparable to a nut cracker so organized that inward movement of the mentioned arms operates similarly to a toggle, to produce outward pressure on the mentioned offset ends, and thereby to produce a corresponding clamping pressure on the polish rod.

It is a further object of this invention to provide a simple and effective organization, of the general character described, with means, preferably threaded, for the convenient application of requisite power, tending to force said arms together.

Other objects of my invention will appear from the following description of a typical embodiment thereof, taken in connection with the appended claims and the accompanying drawings, in which Fig. 1 is a somewhat diagrammatic elevational view, showing one end of a walking beam, a reciprocable polish rod, with connecting means, of a type illustrating my invention, interposed therebetween.

Figure 1:
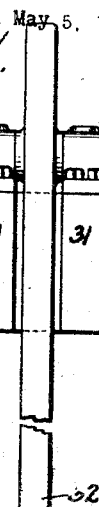
Figure 2:
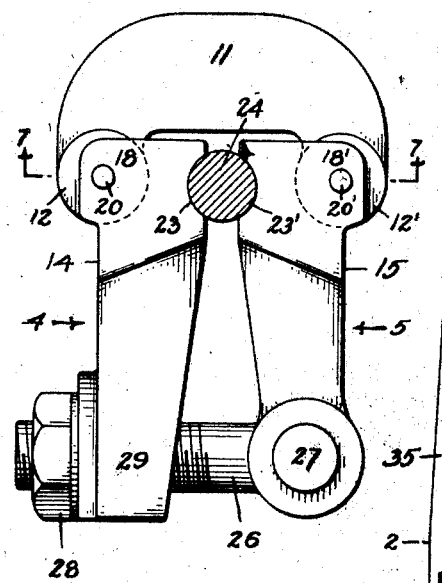
Fig. 2 is a somewhat enlarged plan view separately illustrating a clamp organization, this view being taken in substantially the plane indicated by the line 2—2 of Fig. 1.

Figs. 6 and 7 are respectively a partial horizontal section in a broken plane such as is approximately indicated by the lines 6—6 of Fig. 1, and Fig. 7 and a vertical section substantially as indicated by the line 7—7 of Fig. 2, showing optional features of modification, as hereinafter referred to.

In the embodiments of my invention chosen for the purpose of illustration, an intermediate clamp body member 11 is shown as provided with offset ends 12, 12', having parti-cylindrical convex bearing surfaces 13, 13'; and with these I may associate a pair of lever arms 14, 15, shown as provided at their inner ends with outer cylindrical concavities 16, 17 corresponding in curvature and adapted to interfit with the mentioned convex surfaces of the offset ends 12, 12'.

As a suitable means tending to secure the mentioned parts against accidental separation, I may provide the mentioned intermediate member, or the mentioned arms (and preferably the latter) with means such as ears 18, 18'; and through these I may also insert pivot pins 20, 20', shown as extending concentrically relatively to the bearing surfaces 13, 13' of the offset ends 12, 12'.

The intermediate member 11 is intended to be so rugged and the mentioned interfitted curved surfaces are intended to be so extensive as to withstand all stresses produced by leverages tending to force the ends 12, 12' apart; but the pins 20, 20' although not intended normally to carry any considerable load, may nevertheless be provided, if desired, with bearing shims 21, 21'; and, to facilitate the introduction of these, when desired, the ends 12, 12' may advantageously be cored, as at 22. It is not necessary to efficient operation that the intermediate element 11 and the arms 14, 15 be permanently secured together in any way whatever; but it is essential, for the purposes of my present invention, that the inner ends of said arms be provided with additional concavities 23, 23', disposed in a cooperative relationship on the inner sides thereof and adapted to receive and grip a polish rod 24. The respective concavities 23, 23' may be adapted to fit concentrically upon a polish rod, pivoting slightly thereon without marring the same during a compression movement of the arms 14, 15; and the positions of the axes of curvature of these last mentioned concavities, relatively to the axes of curvature of the outer concavities 16, 17 and relatively to the longitudinal axis of the arms 14, 15 (which latter may be cut away, as at 25, 25' to reduce their weight) may be such that any inward movement of said arms tends to cause, between the mentioned parts, relative movements which force the parallel axes of the pins 21, 21' and the axis of the rod 24 toward a common plane.

In the sense just indicated, the described parts of my clamp, suggestive of a nutcracker in their general relationships, may be more significantly compared with a so-called toggle-joint or system of toggle levers, in which the rod 24 may be regarded as providing a central pivot whose inward or rearward movement tends powerfully to to spread the offset ends 12, 12' of the intermediate element 11; but it will be appreciated that, such spread being prevented by the integral and rigid character of the last mentioned parts, (which may more or less completely counterbalance the weight of the arms 14, 15 and associated parts) the mentioned inward movement is necessarily effective only in causing a reliable gripping engagement of the rod 24.

To effect the mentioned inward movement of the arms 14, 15, I may employ any preferred means, such as an eyebolt 26 secured by a pivot pin 27, shown as extending parallel with the mentioned pins and as threaded at its outer end for engagement by a wing nut or other nut 28,—this nut, or a washer therebelow, being adapted to contact with a flat face or faces such as are provided at 29 on the opposite sides of a slot or other aperture 30,—through which the body of the bolt 26 may freely extend.

Figure 3:
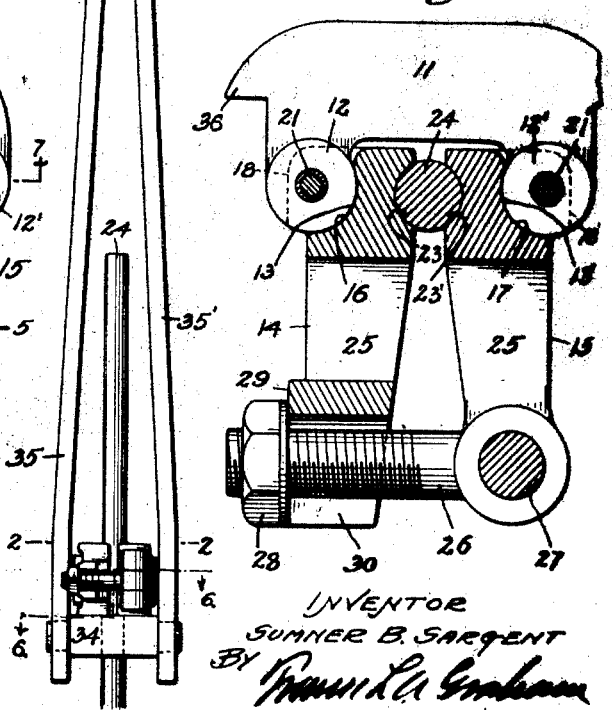
Fig. 3 is a view similar to Fig. 2, but showing a modified form and taken on a section line such as the line 3—3 of Fig. 4.

Suitable parts of a typical organization in which one of my clamps is used are shown in Fig. 1, 31 being an end of a walking beam, and 32 being a link pivoted thereto, by a short shaft 33, near its upper end and bifurcate at its lower end,—where its legs may receive the pivots of a substantially horizontally clamp-supporting plate 34; and, whether or not the parts of my clamp are so proportioned as to effect a substantial balance thereof with reference to, for example, the longitudinal axis of a polish rod 24, it is important that my clamp be suitable to be inserted and normally self-retained between the legs 35, 35' of the link 32. For the purpose last referred to, although no special provision of this character is indispensable, I may provide one or more of the described parts of my clamp, and one or more of the parts contacting therewith, with loosely interfitting means for the removable retention of said clamp. For example, as suggested in Fig. 3, to contribute to balance, and to prevent a clamp from falling forward, I may provide the intermediate member 11 with equal or unequal lateral projections comprising shoulders 36, normally out of contact with, but capable of engaging the corresponding faces of the legs, 35, 35'; or, as shown in Figs. 6, and 7, I may employ, between the mentioned parts a loosely fitting lug-and-slot connection.

When retaining means of the general character suggested are provided, a slight relative elevation of the clamp proper may suffice to free the notches or vertical grooves 37 from engagement by comparatively short vertical projections or beads 38; and the fit between the parts last referred to should be so loose as not to interfere with an intended limited pivotal movement between the plate 34 and the legs 35, 35',—said plate normally retaining a horizontal position, notwithstanding the varying inclinations of the link 32, incidental to its reciprocation.

It should be understood that I may either provide complete clamps in various sizes, adapting them to be used with polish rods of different diameters, or I may use an identical intermediate member in connection with readily removable pairs of arms, the respective pairs however having their inner concavities adapted, in all cases, very accurately to fit polish rods of different standard or special diameters, without defacing the same incidentally to the described gripping action.

Some use is currently made of hollow polish rods, the channel therethrough being sometimes employed for the upward delivery of sand or other foreign matter tending to contaminate oil or another fluid pumped, and the provision of suitable means for the gripping of a hollow rod, without marring or crushing the same, has become a serious problem. In all forms of my invention, and especially in that form which I have illustrated in Figs. 6 and 7, I solve this problem not only by establishing the mentioned mechanical and functional relationships but also by giving the rod-engaging portions or jaws a very considerable vertical length. In fact, as suggested in Fig. 7, showing the gripping of a hollow rod 24'', and suggesting the use of very loose pins without shims, I may provide arcuate bosses 39'' at the upper and lower ends of the bearing concavities 23 and these may serve not only to increase the bearing surface by elongating the same but also as a means, independent of or additional to the described means, for the centering and retention of my clamp relatively to a plate 34'', pivoted to legs 35.'' As best shown in Fig. 6, a plate for use with a clamp having arcuate bosses 39'', instead of being provided with a mere central circular hole therethrough, may be provided with an arcuate depression 40'', to which extends a slot 41''. If desired, a wedging action between parts interfitting as at 42'', Fig. 7, may then contribute to the closing of the "nut-cracker" jaws 43'', with which the bosses 39'' are integral; and either of the horizontal faces 44'' of my clamp may, in any event, be placed uppermost, as may be preferred, to facilitate the opening and closing of the same by either a right-handed or a left-handed workman.

Figure 4:
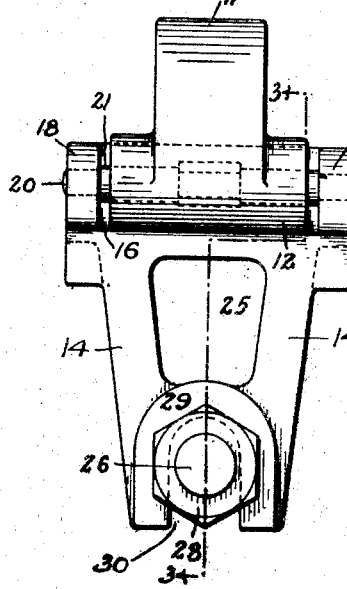
Fig. 4 is an elevational view taken substantially as indicated by the arrow 4 of Fig. 2.
Figure 5:
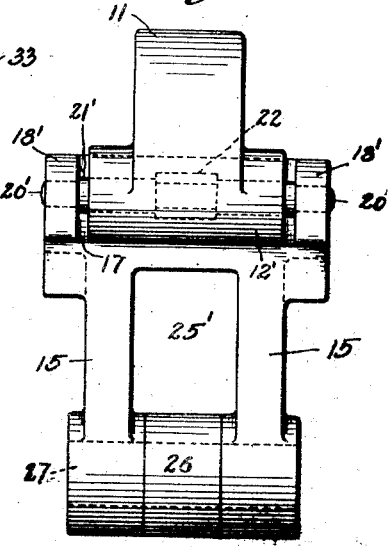
Fig. 5 is an elevational view, taken substantially as indicated by the arrow 5 of Fig. 2.

In Figs. 4 and 5 I show the intermediate member 11 as of such form that a central vertical section would disclose a rectangular outline; but I may optionally reduce the weight of this element by giving the same such a form as is implied in Fig. 6 providing a channel 11ᶜ between fins 11ᵇ; and, although I have heretofore assumed that the convex bearing surfaces of the offset ends are of the same curvature and coaxial with the cylindrical concave surfaces contacting therewith, I may optionally establish a rocking, rather than a slipping or rotational relationship between these surfaces, as by providing an arm or arms 15'' with a convexity 17'' which, although preferably not closely approaching actual flatness, is designed with a substantially greater radius of curvature than the cooperating surface 13''. In this case, to check relative slippage while nevertheless permitting the intended rocking movement and to vary the actual fulcrum point of the arm 15'', I may optionally provide the mentioned surfaces with apposable pairs of grooves or channels 45'', 46'' shown as extending only part way therethrough, into any cooperating pair of which a rather loosely fitting key 47'' may be inserted, this key, rather than a pin 21'' (shown as extending through ears 18'') then serving as a pivot; and, when it is desired to render one of my described clamps effective not only to lift a polish rod, or the like, but also to depress the same, as may be desirable in, for example, the pumping of heavy oils, I may employ means such as additional pins, for example cotter pins 48'', shown as extending loosely through transverse channels 49'' and 50'', cut respectively through the vertical grooves 37 and the projections 38, and serving to prevent or restrict play between the clamp provided therewith and reciprocating members 35'', or their equivalent.

It will be obvious that a very slight relative rotation of the nut 28, or its equivalent, is effective to cause any clamp of the general character described powerfully to engage a polish rod, with the result that reciprocations of the walking beam 31, or its equivalent, are imparted thereto, and to any pump or other parts suspended therefrom, —gravity being generally effective to maintain the rod 24, or its equivalent, in a substantially vertical position; and the pivotal connections described, or alternative connections of any preferred type, may be relied upon to prevent undesirable or excessive strains upon or wear of any of the mentioned parts.

Although I have herein described a single complete embodiment of my invention, suggesting certain optional details, it will be understood that various features of my invention may be independently used, and also that numerous modifications might be made, by those skilled in the art to which this case relates, without the slightest departure from the spirit and scope of my invention, as the same is indicated above and in the following claims.

I claim as my invention:

1. In an organization of the character described an intermediate clamp body member having offset terminal portions or ends; and two arms pivoted, at their inner ends, relatively to said offset ends and releasably connected at their outer ends, by means operable to draw them together.

2. An organization as defined in claim 2 in which said arms are connected by an intermediate member terminating in pivot elements having parti-cylindrical surfaces adapted to interfit with correspondingly curved surfaces of said arms.

3. An organization as defined in claim 2 in which said arms are provided with ears and are secured in their intended relationships, which permits a gripping action, a releasing action or a ready substitution, by an interfitting or parti-cylindrical surfaces and by pins extending through said ears.

4. An organization as defined in claim 2 in which said arms are provided, near one end, with outer concavities respectively adapted to engage said intermediate member, and also with inner concavities, adapted to cooperate in the retention of a polish rod.

5. An organization as defined in claim 2 in which said arms are provided, near one end, with outer concavities respectively adapted to engage said intermediate member, and also with inner concavities, adapted to cooperate in the retention of a polish rod and in which the last-mentioned concavities are so disposed relatively to said outer concavities that an inward movement of said arms tends to move the centers of curvature of said inner concavities toward a plane common to the axes upon which said arms are pivoted.

6. An organization of the general character described comprising: four parts pivoted together on substantially parallel axes, two of said parts being arms comparable in function to the handles of a nutcracker, and one of said parts being a means for drawing said arms together at will.

7. A polish rod clamp comprising: pivoted arms having concavities which correspond in curvature with cylindrical surfaces of a polish rod; and an intermediate member between whose ends said arms are so interposed as to render the inner ends thereof effective as parts of a toggle, said concavities compressively engaging said rod while remaining concentric therewith.

8. A polish rod clamp comprising: an intermediate clamp body element; and relatively movable arms one of whose inner ends is provided with concavities on the respective inner and outer faces thereof adapting the same, when said arms are drawn together, to engage both said intermediate member and said polish rod and to press said polish rod toward said intermediate member.

In testimony whereof, I have hereunto set my hand at Los Angeles, California, this 23rd day of April 1925.

SUMNER B. SARGENT.